(12) United States Patent
Tsay et al.

(10) Patent No.: US 11,872,887 B1
(45) Date of Patent: Jan. 16, 2024

(54) DISPLAY SYSTEM AND VEHICULAR HEAD-UP DISPLAY SYSTEM USING THE SAME

(71) Applicants: INTERFACE TECHNOLOGY (CHENGDU) CO., LTD., Chengdu (CN); INTERFACE OPTOELECTRONICS (SHENZHEN) CO., LTD., Shenzhen (CN); INTERFACE OPTOELECTRONICS (WUXI) CO., LTD., Wu Xi (CN); GENERAL INTERFACE SOLUTION LIMITED, Miaoli County (TW)

(72) Inventors: Wei Hung Tsay, Shenzhen (CN); Kun Da Lu, Shenzhen (CN)

(73) Assignees: Interface Technology (Chengdu) Co., Ltd., Chengdu (CN); Interface Optoelectronics (Shenzhen) Co., Ltd., Shenzhen (CN); Interface Optoelectronics (WuXi) Co., Ltd., Wu Xi (CN); General Interface Solution Limited, Miaoli County (TW)

( * ) Notice: Subject to any disclaimer, the term of this patent is extended or adjusted under 35 U.S.C. 154(b) by 0 days.

(21) Appl. No.: 18/166,584

(22) Filed: Feb. 9, 2023

(30) Foreign Application Priority Data

Nov. 30, 2022 (CN) .......................... 202211517944.7

(51) Int. Cl.
*B60K 35/00* (2006.01)

(52) U.S. Cl.
CPC ...... *B60K 35/00* (2013.01); *B60K 2370/1529* (2019.05); *B60K 2370/23* (2019.05); *B60K 2370/31* (2019.05); *B60K 2370/785* (2019.05)

(58) Field of Classification Search
None
See application file for complete search history.

(56) References Cited

U.S. PATENT DOCUMENTS

| 2021/0271076 A1* | 9/2021 | Ono | .......................... G02B 5/10 |
| 2023/0118416 A1* | 4/2023 | Hirata | ...................... G02B 5/30 |
| | | | 359/630 |

\* cited by examiner

*Primary Examiner* — Stephen T. Reed
(74) *Attorney, Agent, or Firm* — Rosenberg, Klein & Lee (57) ABSTRACT

A display system and a vehicular head-up display system using the same is disclosed. The display system includes an image generating device, a polarization reflection film, a light-transmitting substrate, a curved wave plate, a curved reflector and a transparent substrate. The image generating device emits polarized light. The curved wave plate adheres to the reflective curved surface of the curved reflector through an optical adhesive. The curved wave plate and the reflective surface have the same curvatures. The reflective curved surface faces towards the polarization reflection film. When the curved reflector reflects the polarized light sequentially passing through the polarization reflection film and the curved wave plate to the polarization reflection film through the curved wave plate, the curved wave plate converts the polarization direction of the polarized light. Finally, the polarization reflection film reflects the polarized light to the transparent substrate to generate a virtual image.

22 Claims, 5 Drawing Sheets

DISPLAY SYSTEM AND VEHICULAR HEAD-UP DISPLAY SYSTEM USING THE SAME

This application claims priority of Application No. 202211517944.7 filed in Mainland China on 30 Nov. 2022 under 35 U.S.C. § 119; the entire contents of all of which are hereby incorporated by reference.

BACKGROUND OF THE INVENTION

Field of the Invention

The present invention relates to display technology, particularly to a display system and a vehicular head-up display system using the same.

Description of the Related Art

A head-up display system for a vehicle, which is capable of effectively providing information to a driver in a vehicle, has been researched and developed. The head-up display system may display and provide a vehicle's driving speed, fuel efficiency, and engine status, and may also provide navigation information guiding a driver along the road on which the vehicle is traveling. The head-up display is a display device that displays driving information to a driver by overlapping the driving information on a front view through a windshield or a combiner.

Typical optical parameters to indicate the performance of the head-up display include an angle of view and a virtual image distance (VID). Generally, the angle of view of the head-up display is about 5 degrees to about 6 degrees, and the VID is about 2 m to about 3 m. In order to provide the driver with driving information in a wider field of view and with a virtual image matching a position of a real focal point, it may be necessary that the angle of view is 10 degrees or more and the VID is 7 m or more.

Combiner head-up displays provide a virtual image to a driver through a combiner provided at a position lower than the driver's gaze. Accordingly, the combiner head-up display may not provide a virtual image without disturbing the driver's gaze.

Windshield head-up displays may provide a virtual image at a position that minimizes the driver's gaze movement. However, the shape of the windshield of a vehicle on which a virtual image is provided causes various aberrations such as astigmatism and distortion, and it is not easy to correct the aberrations through an optical design. The conventional optical architecture needs to employ a flat mirror and two freeform mirrors, wherein the free-form mirrors are used to compensate for aberrations. Because the mirrors cannot overlap in space, it is difficult to reduce the size of the optical architecture.

To overcome the abovementioned problems, the present invention provides a display system and a vehicular head-up display system using the same, so as to solve the aforementioned problems of the prior art.

SUMMARY OF THE INVENTION

The present invention provides a display system and a vehicular head-up display system using the same, which decreases the number of elements, reduces the size of the entire system, and maintains a large field of view.

The present invention provides a display system, which includes at least one image generating device, a polarization reflection film, a light-transmitting substrate, a curved wave plate, a curved reflector, and a transparent substrate. The image generating device is configured to emit polarized light with a first polarization direction, wherein the polarized light includes image information. The polarization reflection film and the light-transmitting substrate are provided on the optical path of the polarized light. The polarization reflection film is formed on the surface of the light-transmitting substrate through an optical adhesive and configured to transmit the polarized light. The curved wave plate and the curved reflector have the same curvatures. The curved wave plate adheres to the reflection curved surface of the curved reflector through an optical adhesive. The reflection curved surface faces towards the polarization reflection film. The curved wave plate and the curved reflector are provided on the optical path of the polarized light. When the curved wave plate transmits the polarized light, the curved wave plate converts the phase of the polarized light. When the curved reflector reflects the polarized light sequentially passing through the polarization reflection film and the curved wave plate to the polarization reflection film through the curved wave plate, the curved wave plate converts the first polarization direction of the polarized light into a second polarization direction different from the first polarization direction. The transparent substrate is provided on the optical path of the polarized light with the second polarization direction. The polarization reflection film is configured to reflect the polarized light with the second polarization direction to the transparent substrate to generate a virtual image.

In an embodiment of the present invention, the polarization reflection film is a polarization beam splitting film.

In an embodiment of the present invention, the reflection curved surface is a concave curved surface.

In an embodiment of the present invention, the reflection curved surface is a spherical surface.

In an embodiment of the present invention, the reflection curved surface is an aspherical surface or a freeform curved surface.

In an embodiment of the present invention, the curved wave plate is a quarter wave plate.

In an embodiment of the present invention, the first polarization direction is perpendicular to the second polarization direction.

In an embodiment of the present invention, the polarization reflection film and the light-transmitting substrate are rotatable.

In an embodiment of the present invention, the image information comprises a left-eye image and a right-eye image and the at least one image generating device includes a first image generating device configured to generate the left-eye image and a second image generating device configured to generate the right-eye image.

In an embodiment of the present invention, the display system further includes a sensor configured to track the position of the eyes of a user.

In an embodiment of the present invention, the display system further includes a processor coupled to the image generating device and the sensor and configured to control the movement of the image generating device based on the position of the eyes of the user obtained by the sensor.

In an embodiment of the present invention, a vehicular head-up display system is arranged in a vehicle. The vehicular head-up display system includes at least one image generating device, a polarization reflection film, a light-transmitting substrate, a curved wave plate and a curved reflector. The image generating device is configured to emit polarized light with a first polarization direction, wherein the polarized light includes image information. The polarization reflection film and the light-transmitting substrate are provided on the optical path of the polarized light. The polarization reflection film is formed on the surface of the light-transmitting substrate through an optical adhesive and configured to transmit the polarized light. The curved wave plate and the curved reflector have the same curvatures. The curved wave plate adheres to the reflection curved surface of the curved reflector through an optical adhesive. The reflection curved surface faces towards the polarization reflection film. The curved wave plate and the curved reflector are provided on the optical path of the polarized light. When the curved wave plate transmits the polarized light, the curved wave plate converts the phase of the polarized light. When the curved reflector reflects the polarized light sequentially passing through the polarization reflection film and the curved wave plate to the polarization reflection film through the curved wave plate, the curved wave plate converts the first polarization direction of the polarized light into a second polarization direction different from the first polarization direction. The windshield of the vehicle is provided on the optical path of the polarized light with the second polarization direction. The polarization reflection film is configured to reflect the polarized light with the second polarization direction to the windshield to generate a virtual image.

In an embodiment of the present invention, the vehicular head-up display system further includes a sensor configured to track the position of the eyes of a user.

In an embodiment of the present invention, the vehicular head-up display system further includes a processor coupled to the image generating device and the sensor and configured to control the movement of the image generating device based on the position of the eyes of the user obtained by the sensor.

To sum up, the display system and the vehicular head-up display system using the same fold the optical path based on the properties of the polarized light, thereby decreasing the number of elements, reducing the size of the entire system, and maintaining a large field of view.

Below, the embodiments are described in detail in cooperation with the drawings to make easily understood the technical contents, characteristics and accomplishments of the present invention.

DETAILED DESCRIPTION OF THE INVENTION

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

When an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the articles "a" and "the" includes the meaning of "one or at least one" of the elements or components. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. The examples in the present specification do not limit the claimed scope of the invention.

Further, in the present specification and claims, the term "comprising" is open type and should not be viewed as the term "consisted of." In addition, the term "electrically coupled" can be referring to either directly connecting or indirectly connecting between elements. Thus, if it is described in the below contents of the present invention that a first device is electrically coupled to a second device, the first device can be directly connected to the second device, or indirectly connected to the second device through other devices or means. Moreover, when the transmissions or generations of electrical signals are mentioned, one skilled in the art should understand some degradations or undesirable transformations could be generated during the operations. If it is not specified in the specification, an electrical signal at the transmitting end should be viewed as substantially the same signal as that at the receiving end. For example, when the end A of an electrical circuit provides an electrical signal S to the end B of the electrical circuit, the voltage of the electrical signal S may drop due to passing through the source and drain of a transistor or due to some parasitic capacitance. However, the transistor is not deliberately used to generate the effect of degrading the signal to achieve some result, that is, the signal S at the end A should be viewed as substantially the same as that at the end B.

Unless otherwise specified, some conditional sentences or words, such as "can", "could", "might", or "may", usually attempt to express what the embodiment in the present invention has, but it can also be interpreted as a feature, element, or step that may not be needed. In other embodiments, these features, elements, or steps may not be required.

In the following description, a display system and a vehicular head-up display system using the same will be described. The display system and the vehicular head-up display system using the same fold the optical path based on the properties of the polarized light, thereby decreasing the number of elements, reducing the size of the entire system, and maintaining a large field of view.

Figure 1:
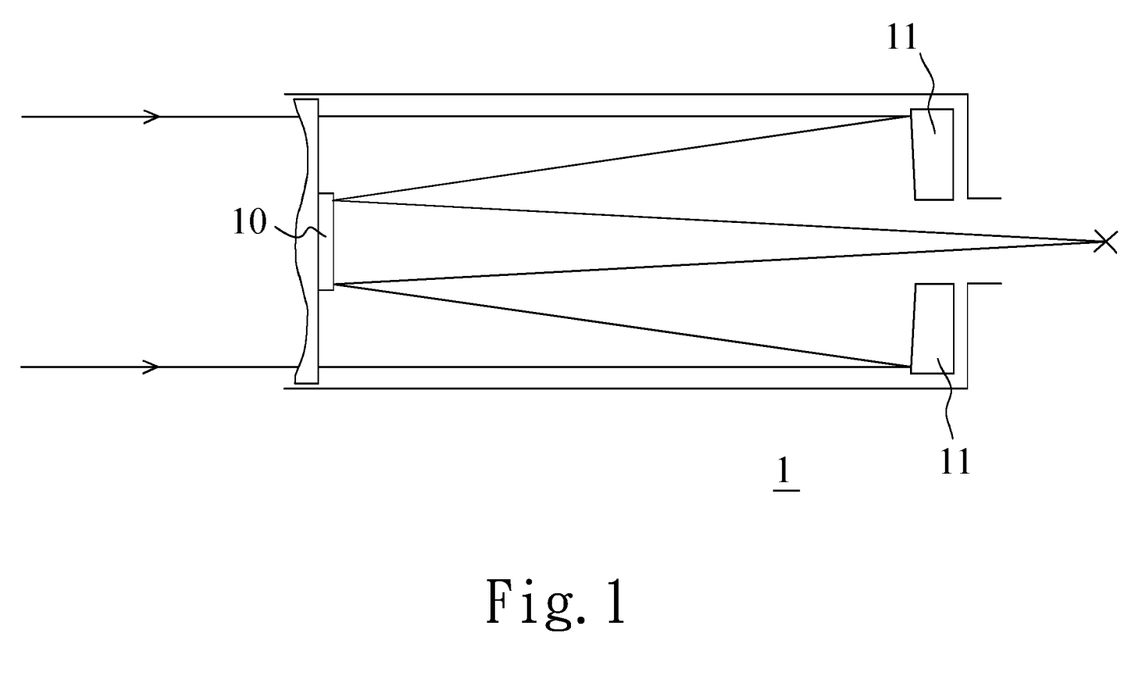
FIG. 1 is a schematic diagram illustrating the Schmidt-Cassegrain telescope.
Figure 2:
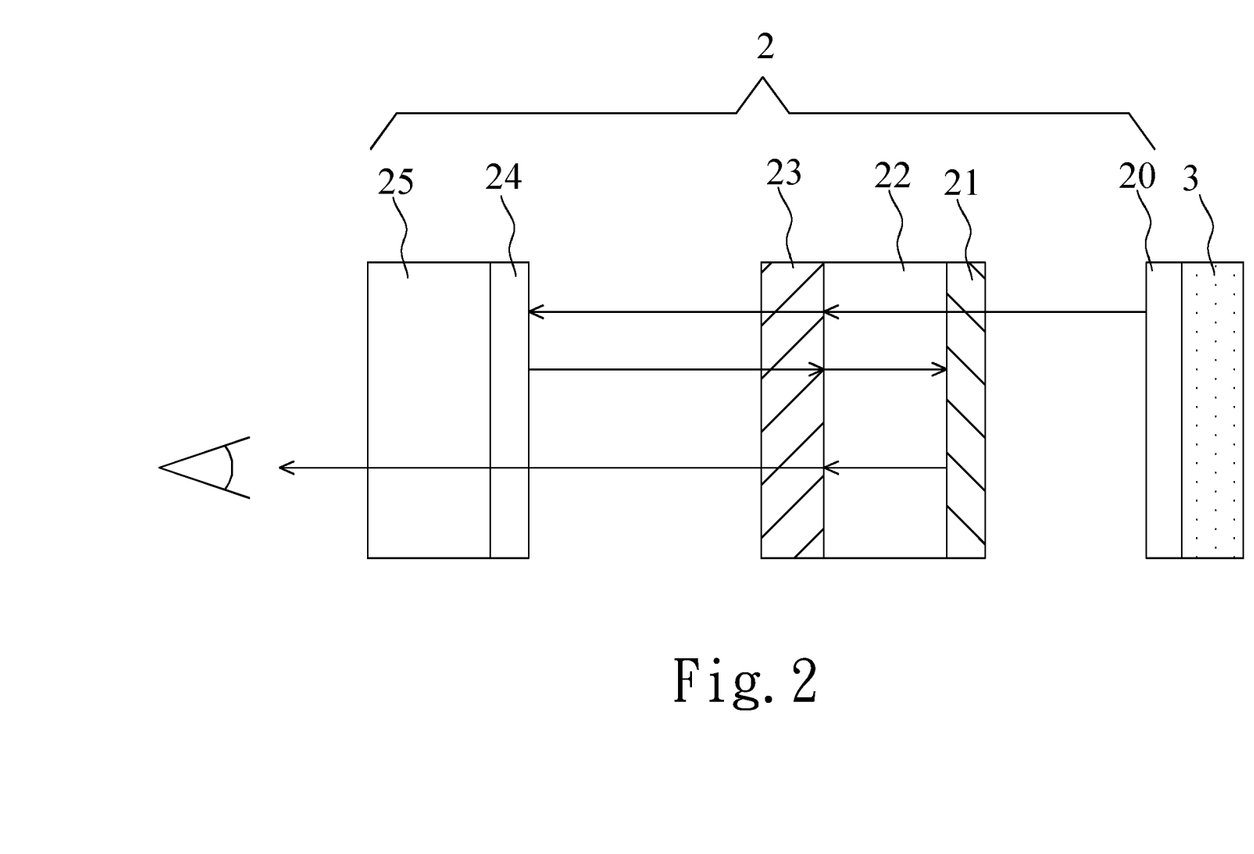
FIG. 2 is a schematic diagram illustrating the Pancake lens assembly.

Firstly, two applications of folding optical paths will be introduced as follows. FIG. 1 is a schematic diagram illustrating the Schmidt-Cassegrain telescope. Referring to FIG. 1, the Schmidt-Cassegrain telescope 1 employs a small reflector 10 and a large reflector 11 to reflect the incident light at a small angle, thereby folding the optical path of the light. The large reflector 11 has a small window for focusing the light on an observer. FIG. 2 is a schematic diagram illustrating the Pancake lens assembly. Referring to FIG. 2, the Pancake lens assembly includes a circular polarizer 20, a polarizing beam splitter 21, a lens 22, a quarter wave plate 23, a reflective polarizer 24, and a lens 25. The circular polarizer 20 is arranged on a display 3. The display 3 emits right-handed polarized light through the circular polarizer 20. After passing through the polarizing beam splitter 21 and the lens 22, the right-handed polarized light is converted into a vertical polarized light by the quarter wave plate 23. The reflective polarizer 24 reflects the vertical polarized light. The vertical polarized light is converted into the right-handed polarized light by the quarter wave plate 23. After passing through the lens 22, the polarizing beam splitter 21 reflects and converts the right-handed polarized light into left-handed polarized light. After passing through the lens 22, the left-handed polarized light is converted into horizontal polarized light by the quarter wave plate 23. The horizontal polarized light is incident on a human eye through the reflective polarizer 24 and the lens 25.

Figure 3:
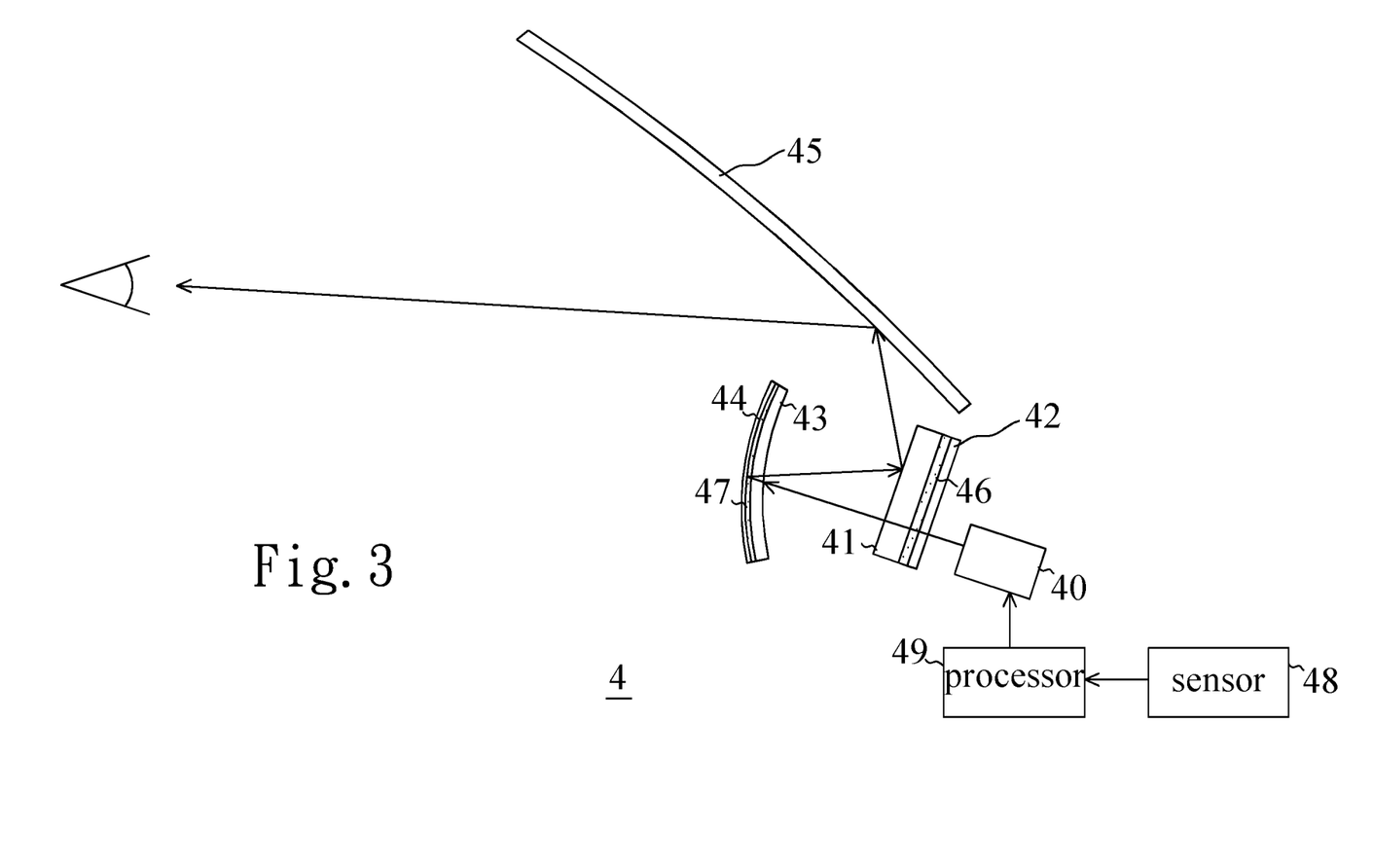
FIG. 3 is a schematic diagram illustrating a display system according to an embodiment of the present invention.

FIG. 3 is a schematic diagram illustrating a display system according to an embodiment of the present invention. Referring to FIG. 3, a display system 4 includes at least one image generating device 40, a polarization reflection film 41, a light-transmitting substrate 42, a curved wave plate 43, a curved reflector 44, a transparent substrate 45, and optical adhesives 46 and 47. For example, the polarization reflection film 41 may be, but not limited to, a polarization beam splitting film. The curved wave plate 43 may be a quarter wave plate or a suitable wave plate. For convenience and clarity, the number of the image generating device 40 is one.

The image generating device 40 emits polarized light with a first polarization direction, wherein the polarized light includes image information. The polarization reflection film 41 and the light-transmitting substrate 42 are provided on the optical path of the polarized light. The polarization reflection film 41, formed on the surface of the light-transmitting substrate 42 through the optical adhesive 46, transmits the polarized light. The curved wave plate 43 adheres to the reflection curved surface of the curved reflector 44 through the optical adhesive 47. The reflection curved surface may be, but not limited to, a concave curved surface, a spherical surface, an aspherical surface or a freeform curved surface. In the embodiment, the reflection curved surface is exemplified by a concave curved surface. The curved wave plate 43 and the reflection curved surface of the curved reflector 44 have the same curvatures. The reflection curved surface faces towards the polarization reflection film 41. The curved wave plate 43 and the curved reflector 44 are provided on the optical path of the polarized light. When the curved wave plate 43 transmits the polarized light, the curved wave plate 43 converts the phase of the polarized light. When the curved reflector 44 reflects the polarized light sequentially passing through the polarization reflection film 41 and the curved wave plate 43 to the polarization reflection film 41 through the curved wave plate 43, the curved wave plate 43 converts the first polarization direction of the polarized light into a second polarization direction different from the first polarization direction. For example, the first polarization direction is perpendicular to the second polarization direction. The transparent substrate 45 is provided on the optical path of the polarized light with the second polarization direction. The polarization reflection film 41 reflects the polarized light with the second polarization direction to the transparent substrate 45 to generate a virtual image. Because the display system 4 needs a large field of view, the curved reflector 44 cannot be bored. Compared with a general head-up display, the display system 4 lacks a reflector and folds the optical path of the polarized light to reduce the volume and cost, thereby maintaining a large field of view. Compared with the volume of a general head-up display, the volume of the display system 4 can be reduced by 30% to maintain the same field of view.

The image information of the polarized light includes a left-eye image and a right-eye image. The display system 4 also employs two image generating devices 40, namely a first image generating device and a second image generating device. The first image generating device and the second image generating device respectively generate the left-eye image and the right-eye image. In addition, the display system 4 may further include a sensor 48 and a processor 49. The sensor 48 tracks the position of the eyes of a user. The processor 49, coupled to the sensor 48 and the image generating devices, controls the movement of the image generating device 40 based on the position of the eyes of the user obtained by the sensor 48. In some embodiments of the present invention, the polarization reflection film 41 and the light-transmitting substrate 42 are rotatable such that the image generating device 40 emits the polarized light at different angles.

Figure 4:
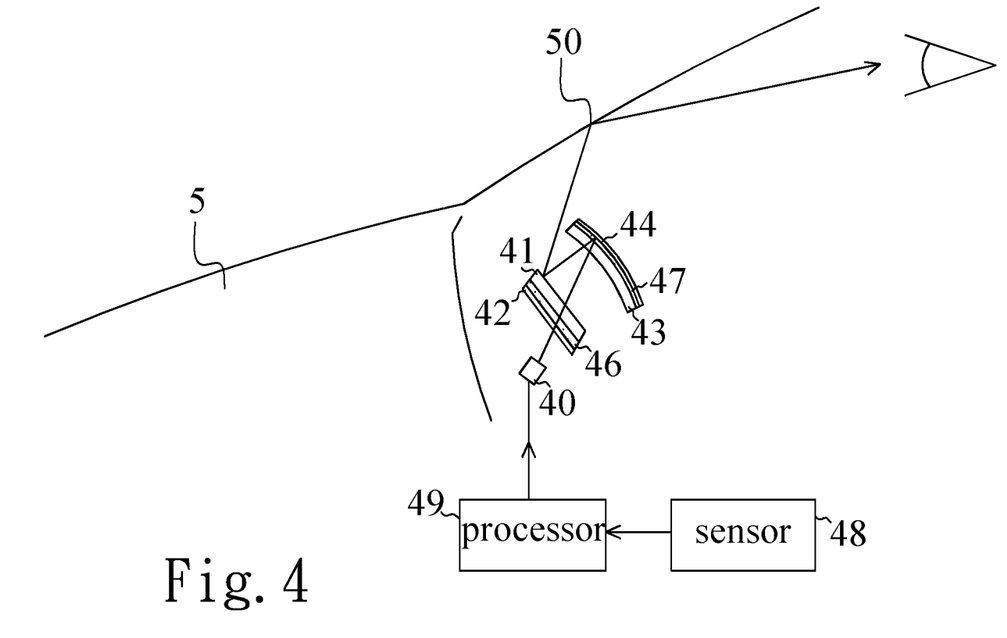
FIG. 4 is a schematic diagram illustrating a vehicular display system according to an embodiment of the present invention.

FIG. 4 is a schematic diagram illustrating a vehicular display system according to an embodiment of the present invention. Referring to FIG. 4, a head-up display system is arranged in a vehicle 5. The head-up display system includes at least one image generating device 40, a polarization reflection film 41, a light-transmitting substrate 42, a curved wave plate 43, a curved reflector 44, and optical adhesives 46 and 47. For example, the polarization reflection film 41 may be, but not limited to, a polarization beam splitting film. The curved wave plate 43 may be a quarter wave plate or a suitable wave plate. For convenience and clarity, the number of the image generating device 40 is one.

The image generating device 40 emits polarized light with a first polarization direction, wherein the polarized light includes image information. The polarization reflection film 41 and the light-transmitting substrate 42 are provided on the optical path of the polarized light. The polarization reflection film 41, formed on the surface of the light-transmitting substrate 42 through the optical adhesive 46, transmits the polarized light. The curved wave plate 43 adheres to the reflection curved surface of the curved reflector 44 through the optical adhesive 47. The reflection curved surface may be, but not limited to, a concave curved surface, a spherical surface, an aspherical surface or a freeform curved surface. In the embodiment, the reflection curved surface is exemplified by a concave curved surface. The curved wave plate 43 and the reflection curved surface of the curved reflector 44 have the same curvatures. The reflection curved surface faces towards the polarization reflection film 41. The curved wave plate 43 and the curved reflector 44 are provided on the optical path of the polarized light. When the curved wave plate 43 transmits the polarized light, the curved wave plate 43 converts the phase of the polarized light. When the curved reflector 44 reflects the polarized light sequentially passing through the polarization reflection film 41 and the curved wave plate 43 to the polarization reflection film 41 through the curved wave plate 43, the curved wave plate 43 converts the first polarization direction of the polarized light into a second polarization direction different from the first polarization direction. For example, the first polarization direction is perpendicular to the second polarization direction. The windshield 50 of the vehicle 5 is provided on the optical path of the polarized light with the second polarization direction. The polarization reflection film 41 reflects the polarized light with the second polarization direction to the windshield 50 to generate a virtual image. Because the head-up display system needs a large field of view, the curved reflector 44 cannot be bored. Compared with a general head-up display, the head-up display system lacks a reflector and folds the optical path of the polarized light to reduce the volume and cost, thereby maintaining a large field of view. Compared with the volume of a general head-up display, the volume of the head-up display system can be reduced by 30% to maintain the same field of view.

The image information of the polarized light includes a left-eye image and a right-eye image. The head-up display system also employs two image generating devices 40, namely a first image generating device and a second image generating device. The first image generating device and the second image generating device respectively generate the left-eye image and the right-eye image. In addition, the head-up display system may further include a sensor 48 and a processor 49. The sensor 48 tracks the position of the eyes of a user. The processor 49, coupled to the sensor 48 and the image generating devices, controls the movement of the image generating device 40 based on the position of the eyes of the user obtained by the sensor 48. In some embodiments of the present invention, the polarization reflection film 41 and the light-transmitting substrate 42 are rotatable such that the image generating device 40 emits the polarized light at different angles.

Figure 5A:
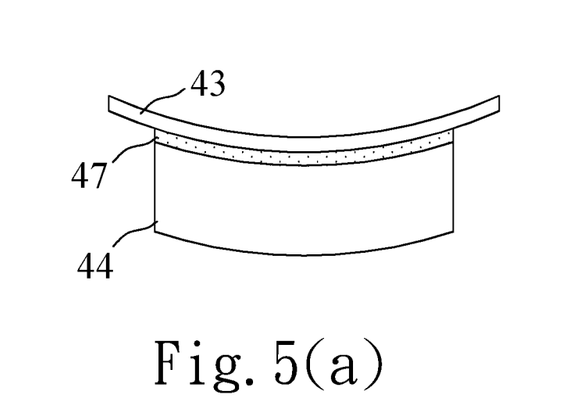
FIGS. 5(a)-5(d) are schematic diagrams illustrating the steps of forming a curved wave plate to adhere to the reflection curved surface of a curved reflector through an optical adhesive according to an embodiment of the present invention.
Figure 5B:
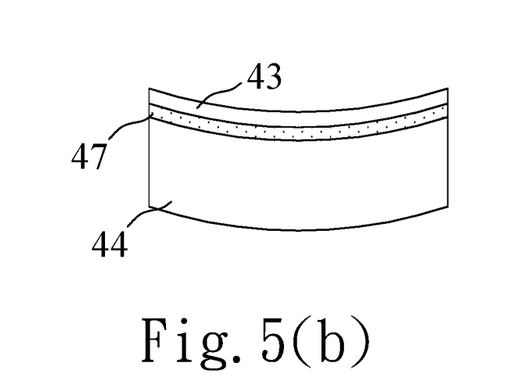
Figure 5C:
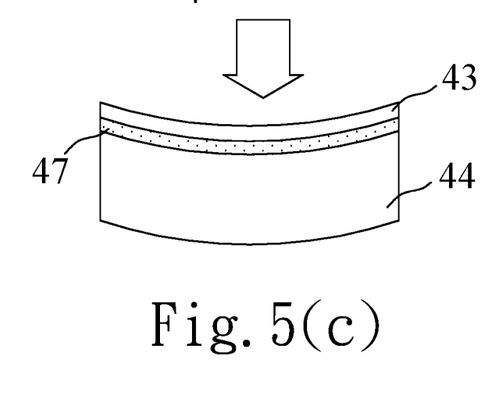
Figure 5D:
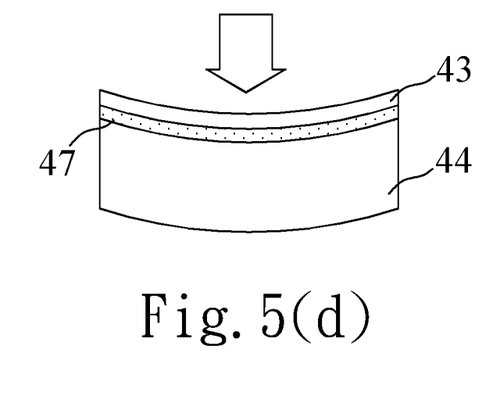

FIGS. 5(a)-5(d) are schematic diagrams illustrating the steps of forming a curved wave plate to adhere to the reflection curved surface of a curved reflector through an optical adhesive according to an embodiment of the present invention. Referring to FIGS. 5(a)-5(d), clean the curved wave plate 43 and the curved reflector 44 are cleaned with plasma. As illustrated in FIG. 5(a), a thermoplastic molding machine forms the curved wave plate 43 to adhere to the reflection curved surface of the curved reflector 44 through the optical adhesive 47. As illustrated in FIG. 5(b), the curved wave plate 43 is trimmed with laser. As illustrated in FIG. 5(c), an autoclave machine pressurizes the curved wave plate 43 and the curved reflector 44 to avoid generating bubbles between the curved wave plate 43 and the curved reflector 44. As illustrated in FIG. 5(d), the optical adhesive 47 is cured with ultraviolet (UV) light.

According to the embodiments provided above, the display system and the vehicular head-up display system using the same fold the optical path based on the properties of the polarized light, thereby decreasing the number of elements, reducing the size of the entire system, and maintaining a large field of view.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A display system comprising:
   at least one image generating device configured to emit polarized light with a first polarization direction, wherein the polarized light includes image information;
   a polarization reflection film and a light-transmitting substrate provided on an optical path of the polarized light, the polarization reflection film formed on a surface of the light-transmitting substrate through an optical adhesive and configured to transmit the polarized light;
   a curved wave plate and a curved reflector having same curvatures, the curved wave plate adhering to a reflection curved surface of the curved reflector through an optical adhesive, the reflection curved surface facing towards the polarization reflection film, the curved wave plate and the curved reflector provided on an optical path of the polarized light, wherein when the curved wave plate transmits the polarized light, the curved wave plate converts a phase of the polarized light, and when the curved reflector reflects the polarized light sequentially passing through the polarization reflection film and the curved wave plate to the polarization reflection film through the curved wave plate, the curved wave plate converts the first polarization direction of the polarized light into a second polarization direction different from the first polarization direction; and
   a transparent substrate provided on an optical path of the polarized light with the second polarization direction, wherein the polarization reflection film is configured to reflect the polarized light with the second polarization direction to the transparent substrate to generate a virtual image.

2. The display system according to claim 1, wherein the polarization reflection film is a polarization beam splitting film.

3. The display system according to claim 1, wherein the reflection curved surface is a concave curved surface.

4. The display system according to claim 1, wherein the reflection curved surface is a spherical surface.

5. The display system according to claim 1, wherein the reflection curved surface is an aspherical surface or a freeform curved surface.

6. The display system according to claim 1, wherein the curved wave plate is a quarter wave plate.

7. The display system according to claim 1, wherein the first polarization direction is perpendicular to the second polarization direction.

8. The display system according to claim 1, wherein the polarization reflection film and the light-transmitting substrate are rotatable.

9. The display system according to claim 1, wherein the image information comprises a left-eye image and a right-eye image and the at least one image generating device comprises:
   a first image generating device configured to generate the left-eye image; and
   a second image generating device configured to generate the right-eye image.

10. The display system according to claim 1, further comprising a sensor configured to track a position of eyes of a user.

11. The display system according to claim 10, further comprising a processor coupled to the at least one image generating device and the sensor and configured to control movement of the at least one image generating device based on the position of the eyes of the user obtained by the sensor.

12. A vehicular head-up display system, arranged in a vehicle, comprising:
   at least one image generating device configured to emit polarized light with a first polarization direction, wherein the polarized light includes image information;
   a polarization reflection film and a light-transmitting substrate provided on an optical path of the polarized light, the polarization reflection film formed on a surface of the light-transmitting substrate through an optical adhesive and configured to transmit the polarized light; and
   a curved wave plate and a curved reflector having same curvatures, the curved wave plate adhering to a reflection curved surface of the curved reflector through an optical adhesive, the reflection curved surface facing towards the polarization reflection film, the curved wave plate and the curved reflector provided on an optical path of the polarized light, wherein when the curved wave plate transmits the polarized light, the curved wave plate converts a phase of the polarized light, when the curved reflector reflects the polarized light sequentially passing through the polarization reflection film and the curved wave plate to the polarization reflection film through the curved wave plate, the curved wave plate converts the first polarization direction of the polarized light into a second polarization direction different from the first polarization direction, a windshield of the vehicle is provided on an optical path of the polarized light with the second polarization direction, and the polarization reflection film is configured to reflect the polarized light with the second polarization direction to the windshield to generate a virtual image.

13. The vehicular head-up display system according to claim 12, wherein the polarization reflection film is a polarization beam splitting film.

14. The vehicular head-up display system according to claim 12, wherein the reflection curved surface is a concave curved surface.

15. The vehicular head-up display system according to claim 12, wherein the reflection curved surface is a spherical surface.

16. The vehicular head-up display system according to claim 12, wherein the reflection curved surface is an aspherical surface or a freeform curved surface.

17. The vehicular head-up display system according to claim 12, wherein the curved wave plate is a quarter wave plate.

18. The vehicular head-up display system according to claim 12, wherein the first polarization direction is perpendicular to the second polarization direction.

19. The vehicular head-up display system according to claim 12, wherein the polarization reflection film and the light-transmitting substrate are rotatable.

20. The vehicular head-up display system according to claim 12, wherein the image information comprises a left-eye image and a right-eye image and the at least one image generating device comprises:
   a first image generating device configured to generate the left-eye image; and
   a second image generating device configured to generate the right-eye image.

21. The vehicular head-up display system according to claim 12, further comprising a sensor configured to track a position of eyes of a user.

22. The vehicular head-up display system according to claim 21, further comprising a processor coupled to the at least one image generating device and the sensor and configured to control movement of the at least one image generating device based on the position of the eyes of the user obtained by the sensor.

* * * * *